US008396904B2

(12) United States Patent
Ylonen

(10) Patent No.: US 8,396,904 B2
(45) Date of Patent: Mar. 12, 2013

(54) UTILIZING INFORMATION FROM GARBAGE COLLECTOR IN SERIALIZATION OF LARGE CYCLIC DATA STRUCTURES

(75) Inventor: Tatu J Ylonen, Espoo (FI)

(73) Assignee: Clausal Computing Oy, Helskinki (FI)

( * ) Notice: Subject to any disclaimer, the term of this patent is extended or adjusted under 35 U.S.C. 154(b) by 618 days.

(21) Appl. No.: 12/356,104

(22) Filed: Jan. 20, 2009

(65) Prior Publication Data

US 2010/0185632 A1 Jul. 22, 2010

(51) Int. Cl.
*G06F 12/00* (2006.01)
*G06F 17/30* (2006.01)

(52) U.S. Cl. ..................................................... 707/813

(58) Field of Classification Search ........... 707/999.206, 707/999.205, 999.2, 999.1, 999.101, 999.102, 707/813–820, 795, 790, 791, 793, 798, 797, 707/802, 803
See application file for complete search history.

(56) References Cited

U.S. PATENT DOCUMENTS

| | | | |
|---|---|---|---|
| 4,803,651 A | | 2/1989 | Galkowski |
| 6,301,585 B1 * | | 10/2001 | Milne ..................................... 1/1 |
| 6,678,882 B1 * | | 1/2004 | Hurley et al. ................. 717/121 |
| 7,415,704 B2 | | 8/2008 | Schmidt |
| 2002/0087590 A1 * | | 7/2002 | Bacon et al. .................. 707/206 |
| 2002/0107880 A1 * | | 8/2002 | Bacon ............................. 707/206 |
| 2003/0069905 A1 * | | 4/2003 | Dussud .......................... 707/206 |
| 2006/0143421 A1 * | | 6/2006 | Subramoney et al. ........ 711/170 |
| 2006/0167960 A1 * | | 7/2006 | Lomet ........................... 707/206 |
| 2010/0174717 A1 * | | 7/2010 | Fambon et al. ................ 707/741 |

OTHER PUBLICATIONS

Shankar, Lakshmi, et al., "Demystifying class loading problems, part 3: tackling more unusual class loading problems" Dec. 13, 2005, IBM <http://www.ibm.com/developerworks/java/library/j-dclp3/index.html>, p. 1-9.*
Dongmei Gao: A Java Implementation of the Simple Object Access Protocol, MSc Thesis, Florida State University, 2001, Chapter 3.
Martin Elsman: Type-Specialized Serialization with Sharin. In Sixth Symposium on Trends in Functional Programming (TFP'05), Tallinn, Estonia, Sep. 2005.
R. van Engelen et al: Toward Remote Object Coherence with Compiled Object Serialization for Distributed Computing with XML Web Services, Workshop on Compilers for Parallel Computing (CPC), 2006, pp. 441-455.
F. Breg: Java Virtual Machine support for object serialization, Java Grande / ISCOPE conference, ACM, 2001, pp. 173-180.
V. Krishnaswamy: Efficient Implementations of Java Remote Method Invocation (RMI). In 4th USENIX Conference on Object-Oriented Technologies and Systems (COOTS'98), Santa Fe, NM, 1998.
S. Abdullahi et al: Collection schemes for distributed garbage, IWMM'92, Springer, 1992, pp. 43-81.
B. Carpenter et al: Object Serialization for Marshalling Data in a Java Interface to MPI, Java'99, ACM, 1999, pp. 66-71.
J. Maassen et al: Efficient Java RMI for Parallel Programming, ACM Transactions on Programming Languages and Systems, 23(6):747-775, 2001.

* cited by examiner

*Primary Examiner* — James Trujillo
*Assistant Examiner* — Jeffrey Chang

(57) ABSTRACT

A method for serializing cyclic or shared data structures using information from the garbage collector to determine that some objects in the data structure being serialized cannot have more than one reference.

11 Claims, 3 Drawing Sheets

US 8,396,904 B2

UTILIZING INFORMATION FROM GARBAGE COLLECTOR IN SERIALIZATION OF LARGE CYCLIC DATA STRUCTURES

CROSS-REFERENCE TO RELATED APPLICATIONS

Not Applicable

INCORPORATION-BY-REFERENCE OF MATERIAL SUBMITTED ON ATTACHED MEDIA

Not Applicable

TECHNICAL FIELD

The invention relates to software technology, particularly serializing complex data structures for external storage and transmission in a computer system utilizing garbage collection.

BACKGROUND OF THE INVENTION

Serialization of data structures (also called linearization or marshalling; it should be noted that all of these terms also have other meanings) means converting a more or less arbitrary data structure to a string of bytes (or words), such that the bytes can be, for example, written to a file, stored in a database, sent over a network to another computer, migrated, or shared in a distributed object system. The bytes contain an encoding of the data structure such that it can later be read in (possibly in a different computer or a different program) and the original data structure restored.

Serialization is readily available in some programming languages or run-time libraries, including Java and C#. Many serialization implementations only support non-cyclic data structures; however, some support arbitrary cyclic or shared data structures and preserve any sharing.

Garbage collectors routinely handle cyclic data structures. They typically use mark bits, forwarding pointers, or any of a number of known mechanisms for detecting and dealing with cyclic data structures. A good reference for garbage collection methods is the book R. Jones & R. Lins: Garbage Collection Algorithms for Automatic Dynamic Memory Management, Wiley, 1996.

Multiobject garbage collection is described in U.S. patent application Ser. No. 12/147,419 by the same inventor, which is incorporated herein by reference.

Several garbage collection mechanisms try to cluster objects such that objects referencing each other are in adjacent memory locations or at least on the same virtual memory page. This is sometimes called linearization. However, the operation and objectives are different from serialization, as the clustering performed by garbage collection does not generally yield a data stream that could be written to external storage and loaded back later; there the goal is simply to speed up program execution by improving the cache hit rate.

The term serialization is frequently used to refer to synchronization of operations in concurrent programs, which meaning is completely different from the meaning used herein.

Distributed garbage collection is frequently used in distributed object systems as well as in many environments utilizing remote method invocation mechanisms. For example, Microsoft's .NET architecture includes distributed garbage collection. A survey of the field can be found in S. Abdullahi et al: Collection schemes for distributed garbage, IWMM'92, Springer, 1992, pp. 43-81.

Several authors have pointed out serialization as a significant performance bottleneck in many applications, for example in Java remote method invocation, where it has been found to dominate remote method invocation costs in some studies. Remote method invocation is a very important tool in building large distributed computing systems, and faster serialization mechanism would thus help make distributed systems more efficient.

There are also applications, such as large knowledge-based systems, where the data structures to be serialized are extremely large, and may grow to billions of objects in the near future. Such data structures also tend to be cyclic and have extensive sharing. Very fast and memory efficient serialization methods will be needed for serializing such data structures.

BRIEF SUMMARY OF THE INVENTION

Existing serialization methods for cyclic data are improved by utilizing information available from the garbage collector to determine that some objects in the object graph cannot have more than one reference, and avoiding checks for sharing and cyclicity for such objects. In practice such objects often comprise a great majority of the objects to be serialized, and the method can significantly improve serialization performance.

The improved method is particularly suitable for use with multiobject-based garbage collection, in which the garbage collector groups objects into linearized trees called multiobjects, where only the root object can have more than one reference. Serialization of large graphs becomes particularly fast in such systems.

The method is also applicable with other garbage collectors, with relatively small changes to the garbage collector. The garbage collector may initialize one or more bitmaps indicating which objects have more than one reference.

The information maintained by the garbage collector can be brought up to date when serialization starts, or modifications to the object graph may be tracked, e.g. in the write barrier, to determine which objects may have had new references added since the last garbage collection.

In addition to speeding up serialization, the improvement significantly reduces memory consumption of serialization, as much fewer objects will need to have information stored in the index data structure.

BRIEF DESCRIPTION OF THE SEVERAL VIEWS OF THE DRAWING(S)

DETAILED DESCRIPTION OF THE INVENTION

Figure 1:
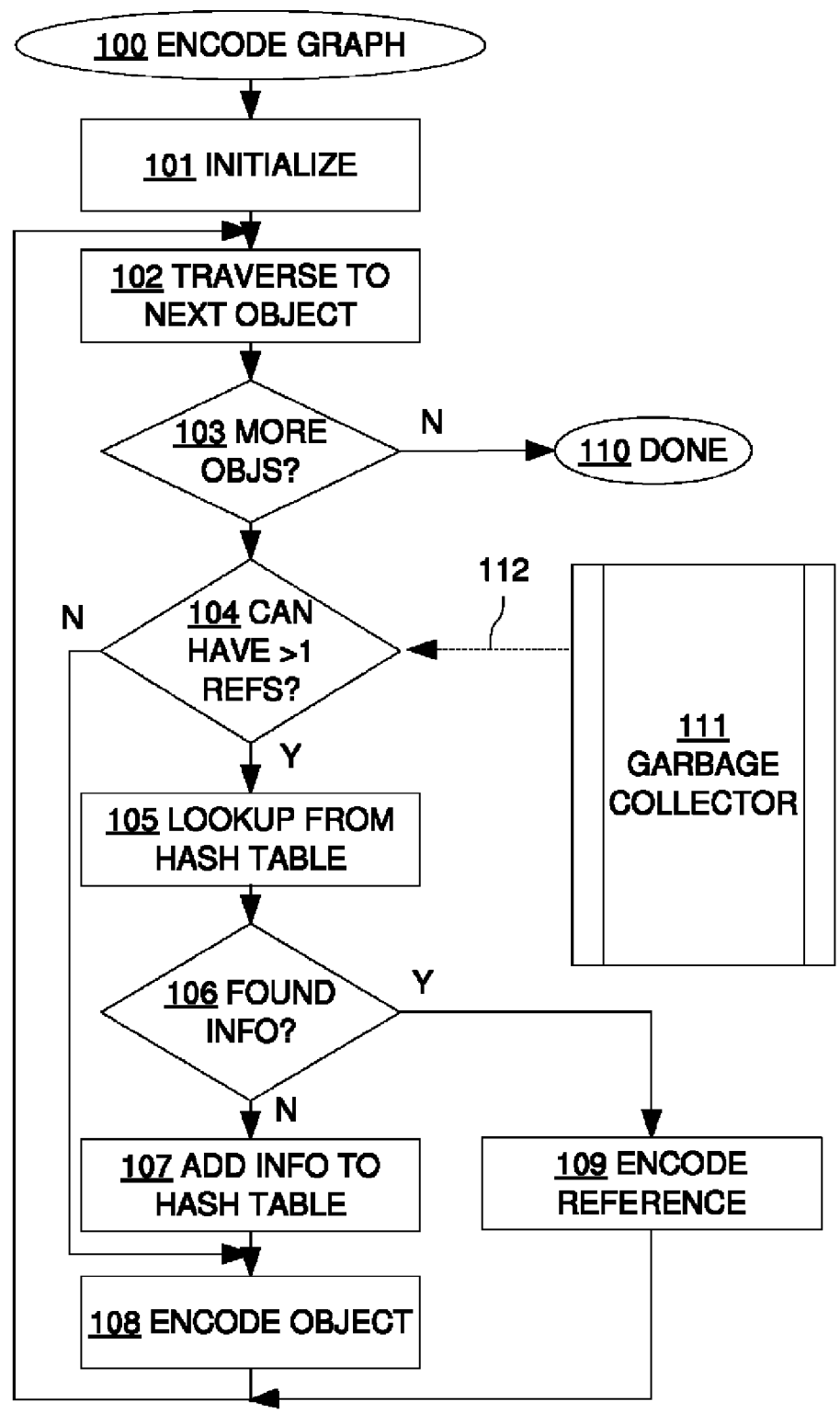
FIG. 1 illustrates a serialization method using information from the garbage collector to determine whether some objects may have more than one reference.

FIG. 1 illustrates a serialization method that utilizes information from the garbage collector. (100) begins serializing (encoding) an object graph (it should be noted that "object" here is not limited to classes or structures; it also includes, e.g., numbers, arrays, strings, hash tables, characters, Lisp-like pairs, Lisp-like symbols and other data values). (101) initializes the traversal (e.g., initializes an index data structure such as a hash table, skip list or search tree and outputs an initial header to the resulting data stream). (102) illustrates traversing the object graph; while it is shown as a box here, it would typically be a recursive function or an iterative function with some or all of the recursion eliminated by, e.g., using an explicit stack data structure, as is well known in the literature relating to eliminating recursion from functions. (103) illustrates testing if there are more objects; if not, serialization is complete at (110) (some terminal actions may be performed, including adding an end marker to the resulting data stream). In general, how to implement the traversal is known to one skilled in the art.

(104) illustrates using information from the garbage collector in serialization. It tests whether the current object may have more than one reference. If it can be determined from data structures (112) obtained from the garbage collector (111) that there is no more than one reference, then there is no need to perform steps (105) to (107), resulting in significant reduction of work and memory consumption, as this is by far the most common case in many applications.

If information from the garbage collector cannot exclude the possibility of there being more than one reference, execution continues from (105), where a lookup is performed from the index data structure (for example, hash table) to determine whether this object has been visited before. If it has been visited before (information was found in (106)), execution continues from (109) to encode a reference to the object, and objects referenced from the current object will not be traversed again. Otherwise information about the object will be added into the index data structure (107), and the object will be encoded (108).

The information stored into the index data structure typically comprises an identifier for the object that can be used to refer to it. The identifier may be a memory address of the object, a unique identifier for the object instance, a sequence number of the object among all objects in the encoded data stream, a sequence number of objects that may have more than one reference, or, e.g., any known persistent or global identifier for the object. In the preferred mode the information consists of a monotonically increasing sequence number of the object among those objects that may have more than one reference, and an indication whether the object may have more than one reference is encoded with the object in (107) or (108).

The garbage collector (111) may be any known garbage collector that can provide the required information (112). In the preferred mode it is a multiobject-based garbage collector.

The information from the garbage collector may comprise any information that permits the serialization process to determine that a significant number of objects cannot have more than one reference. In the case of multiobject-based garbage collection, such information could comprise the multiobject graph maintained by the garbage collector (possibly including nested multiobjects if the version of multiobject garbage collection utilizes them).

The information may also include, e.g., a bitmap for those multiobjects that are not nested multiobjects of any other multiobject, indicating which possible object starting addresses are root objects of multiobjects, i.e., can have more than one reference. For example, if objects are aligned at 16-byte boundaries, such a bitmap would advantageously have a bit for every 16 bytes in the multiobject. The bitmap could be per multiobject, per region, or global. The bitmap may also either be maintained by the garbage collector, or may be computed by the serialization method from the multiobject graph to facilitate executing the test (104) faster. For example, the serialization method could iterate over all nested multiobjects within a given multiobject, and mark the bits corresponding to roots of such multiobjects in the given bitmap (and the bit corresponding to its own root).

The information may also comprise hash tables or other information maintained by the write barrier or other facilities that can be used to track additional references that may have been added since the last garbage collection.

A (partial) garbage collection may also be performed when serialization is about to be started, in order to bring the relevant data structures up to date. A partial garbage collection could mean just updating data structures based on data collected by the write barrier, or this plus young generation collection, or perhaps a full evacuation pause.

For non-multiobject-based garbage collectors, the information may, e.g., comprise a bitmap that is initialized by the garbage collector as it traverses the object tree. The bitmap could be, e.g., per region or global.

Changes to the object graph and references added after the last garbage collection could be tracked e.g. using a write barrier. The book by Jones et al describes several write barrier mechanisms, and an additional one is described in the U.S. patent application Ser. No. 12/353,327, which is hereby incorporated herein by reference. It would be a relatively simple addition to known write barrier mechanisms to, e.g., set a bit in a bitmap with the index of the bit computed from the new value assigned. However, tracking such changes is optional in the method.

The currently preferred mode is to have the application specify whether information from the garbage collector is to be used. If so, then a minor garbage collection is performed before serialization starts. This is particularly suitable for serializing large data structures. For serializing small data structures, the application could specify to not use garbage collection information, in which case step (104) would always assume there could be multiple references, effectively using the method presented herein only for large data structures and avoiding having to track any information in the write barrier.

Figure 2:
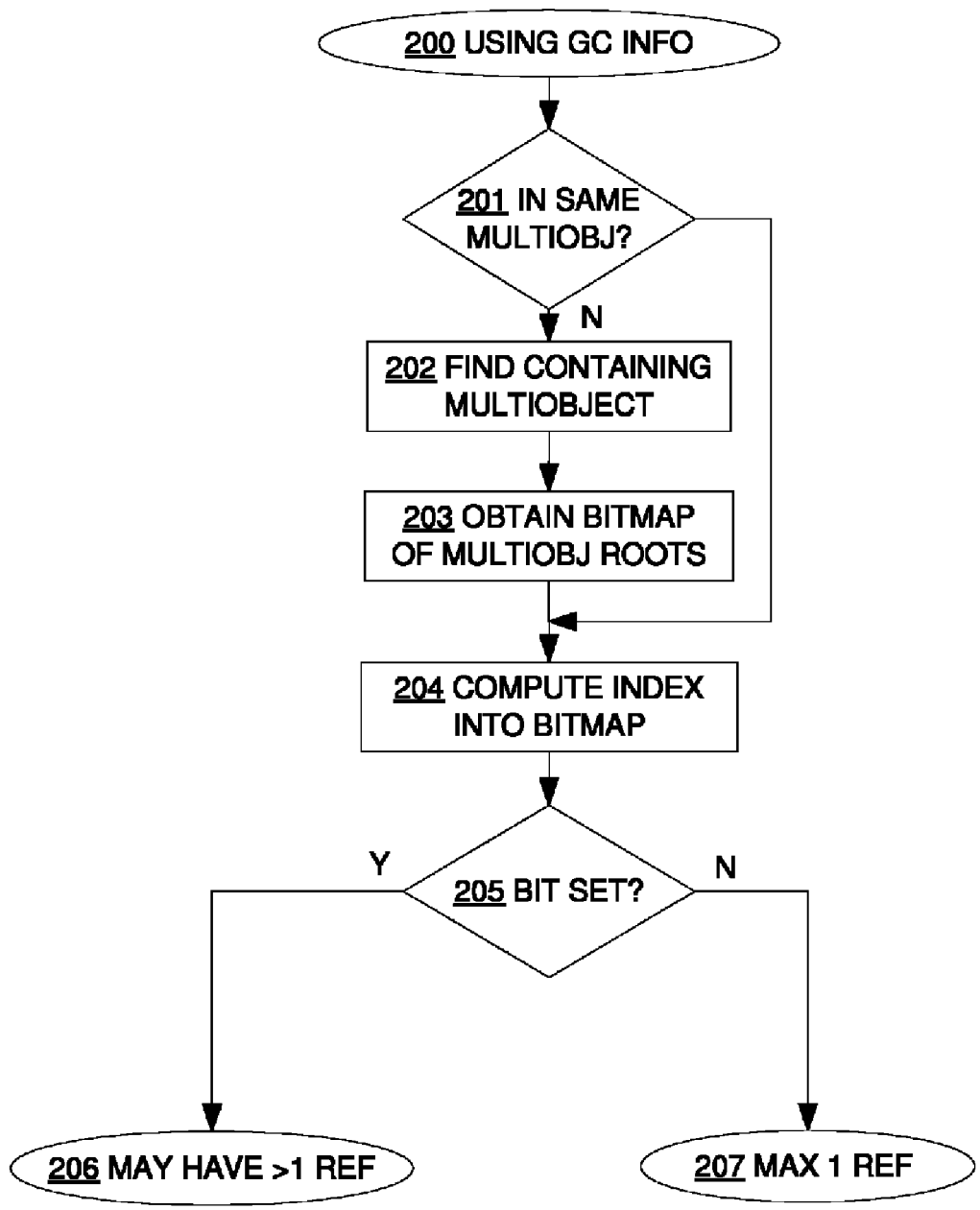
FIG. 2 illustrates using information from the garbage collector when the garbage collector is a multiobject based garbage collector.

FIG. 2 illustrates how garbage collection information (112) can be used in (104). (200) is the starting point; at (201) it is checked whether the current object resides in the same multiobject as the previous one we checked (or more generally, whether the previously used bitmap also covers the current object). If so, we jump to (204) to compute an index into the same bitmap that was used last time. Otherwise we look up the multiobject containing the current object (202) by performing a lookup into an index data structure (a randomized binary tree in the preferred embodiment) maintained by the garbage collector, obtain a bitmap that includes the containing multiobject, the bitmap indicating which addresses (at least within the multiobject) are multiobject roots (203), and then continue to (204) to compute the index. Obtaining the bitmap may mean e.g. retrieving it from the garbage collector's data structures, or constructing one by e.g. initializing a bitmap to zero, traversing the relevant part of the tree of nested multiobjects, and setting the bits corresponding to multiobject roots in the bitmap (either polarity could be used to indicate a multiobject root). Locking may be needed to ensure consistency of the garbage collector data structures.

At (204) the index of the bit in the bitmap is computed. If objects are aligned at 16-byte boundaries, then there would be one bit per 16 bytes, and the index computation would be something like:

$$idx = (addr - \text{start\_addr}) >> 7;$$

Step (205) gets a bit from the bit map, e.g., using (on a 64-bit system):
  if ((bitmap[idx>>6] & (1<<(idx & 63))) !=0)
    ... bit is set;
  else
    ... bit is not set;

In 32-bit systems 4-byte and 8-byte alignments are more common, but these cases are analogous, with the numeric values correspondingly smaller.

We preferably interpret bit set as the object address being a multiobject root, in which case execution continues from (206), and otherwise it is determined that the object can have at most one reference, and execution continues from (207).

As an alternative to the described approach, we could also always use the index data structure offered by the garbage collector to check if the current object is a multiobject root. However, if the data structure to be serialized contains a multiobject root, then it will also contain all other objects of the same multiobject, and using the bitmap is an optimization for this situation. The bitmap is particularly useful if nested multiobjects are used, as such nested multiobjects may reside within the address range of a larger multiobject.

An further possible approach would be to consider multiobjects also in the traversal operation, effectively traversing a multiobject at a time, serializing all objects in a multiobject without any checks for multiple references, and adding all exits from the multiobject into a queue or stack of multiobjects that still need to be serialized. In this approach, all roots of multiobjects would be considered as potentially having more than one reference.

In a non-multiobject-based garbage collector, one could have a bitmap per independently collectable region, with one bit for each possible object starting address. When the region is garbage collected, the bitmap is cleared; then whenever the garbage collector encounters an already moved (or marked, if mark-and-sweep) object, the corresponding bit in the bitmap is set to one.

However, there is a clear advantage for multiobject-based garbage collection here, as it automatically has information that is useful for speeding up serialization, whereas additional work will be needed with many other kinds of garbage collectors.

For very large knowledge-based systems the information that must be loaded into main memory during start-up may comprise billions of objects, and must be serialized for CPU and memory efficient loading. As the system acquires new information, the start-up knowledge base may also need to be updated. Methods for efficiently serializing such extremely large data structures may turn out absolutely critical in such systems, as the index data structures for storing information about visited objects would grow prohibitively large if information needed to be stored in the index data structure about all visited objects, causing the system to run out of memory or severely limiting its memory capacity.

The serialization method presented herein offers a further advantage over known single-pass serialization methods. Since typically a vast majority of objects are determined to have at most one reference using garbage collection information, it is possible to include explicit indication of the object possibly having more than one reference in the encoded data stream, and have the decoder only allocate identifiers and keep pointers to those objects that may have multiple references. Since the decoder needs to store references to all objects that may have multiple references in a reference tracking data structure (usually array or some kind of index data structure), memory consumption in the decoder is very significantly reduced by not having to store most objects there, and decoding becomes faster. This reduction in memory consumption in the decoder can easily be tens of percent of the size of the decoded data structure, which can be particularly significant when the data structure is extremely large, as when loading initial information into a knowledge-based system.

Figure 3:
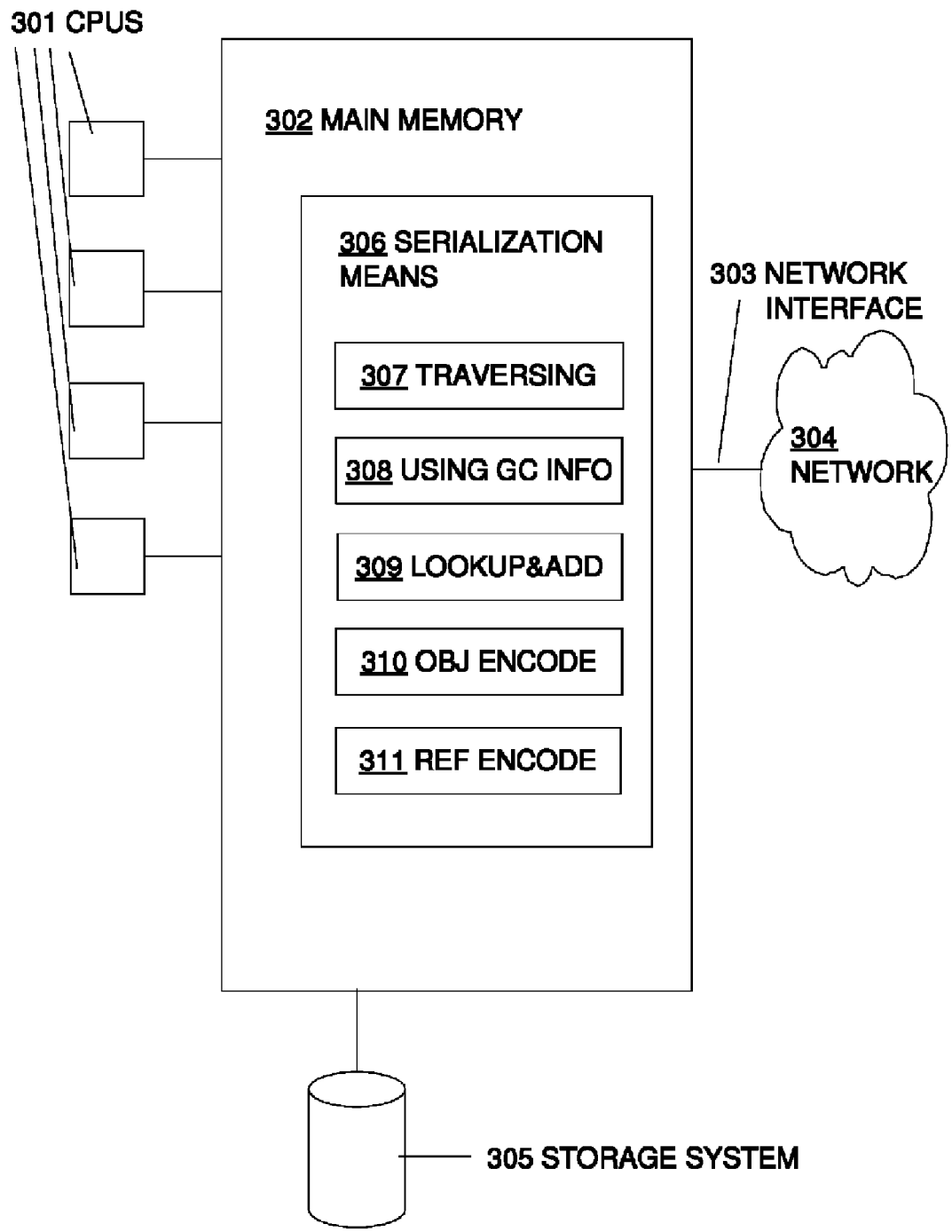
FIG. 3 illustrates a computer system comprising a serialization means comprising a means for using information from the garbage collector.

A second aspect of the invention is illustrated in FIG. 3. It is a computer system comprising one or more processors (301), one or more main memories (302), one or more network interfaces (303) connecting it to one or more networks (304), one or more storage systems (305) and one or more means for serializing a shared or cyclic data structure (306), the means comprising:
  a means for traversing the object graph of the data structure (307)
  a means for using information from the garbage collector to determine whether some objects may have more than one reference (308)
  a means for looking up information about objects that may have more than one reference from at least one index data structure, and if such object cannot be found from the index data structure, adding information about it to the index data structure (309)
  a means for encoding at least some visited objects into an encoded data stream (310); and
  a means for encoding at least some visited objects having more than one reference using an encoding that comprises a reference to an instance of the same object in the encoded data stream (311).

When using multiobject garbage collection, the means for using information from the garbage collector to determine whether some objects may have more than one reference preferably comprises a means for checking whether an object is a multiobject root.

Such a computer system may be any kind of computing system, present or future, from small mobile devices where multiobject-based garbage collection and more efficient serialization result in reduced power consumption, to embedded computers, to very large clustered computing systems comprising many nodes that use a fast serialization method disclosed herein to exchange information, e.g., using network protocols, a distributed object system, a persistent object system, a database, or files stored in the storage system.

A third aspect of the invention is a computer program product, stored on a machine-readable medium, the computer program product being operable to cause a computer to serialize a shared or cyclic data structure, causing the computer to:
  traverse the object graph of the data structure
  for at least some objects, use information from the garbage collector to determine whether the object may have more than one reference
  for at least some objects that may have more than one reference, look up information about the object from at least one index data structure, and if the object cannot be found from the index data structure, add information about it to the index data structure
  encode at least some visited objects into an encoded data stream; and
  encode at least some visited objects having more than one reference using an encoding that comprises a reference to an instance of the same object in the encoded data stream.

In the preferred embodiment such a computer program product will also cause the computer to check whether an object being serialized is a multiobject root.

A nested multiobject, as used here, means a multiobject embedded within another multiobject. Such nested multiobjects are one possible way to deal with transient references to objects within multiobjects e.g. from registers and local variables in an application. Nested multiobjects may also be used to track information about modifications to multiobjects (e.g., when a pointer within a multiobject is written). Nested multiobjects may form a tree under a top-level multiobject. Each nested multiobject begins at a certain offset within the top-level multiobject. One possibility for the bitmaps described here is to have a bitmap associated with each top-level multiobject, and indicate objects that are roots of nested multiobjects in that bitmap.

The encoded data stream means the output of the linearization. It is essentially a stream of bytes (or words), and may be written e.g. to a file or a suitable memory area (such as a string). The data stream may be encoded a bit at a time, a byte at a time, or e.g. a Unicode character at a time. The encoding of the stream may be binary or text; XML encoding is frequently used in some applications. Indications of whether an object may have multiple references could be encoded e.g. using XML tag attributes, special tags, codes, or packet types preceding or following the encoding for an object, or including a bit, flag or other suitable attribute in at least some objects indicating that they may have multiple references. If the encoded data is viewed as executable code, then it could include an instruction for adding an object to a reference tracking data structure.

While serialization was described as operating on one data structure at a time, the interface to serialization could equally well provide for serializing several data structures. Alternatively such multiple data structures could be made one by e.g. putting them on a list that is then serialized. One or more serialization process may run in parallel, and in at least some embodiments serialization can run in parallel with other mutator processing, even if it uses information from the garbage collector.

Many variations of the present invention will be within reach of an ordinary person skilled in the art. Many of the steps in the methods could be rearranged, or operations grouped differently into components of a computer system, without deviating from the spirit of the invention.

What is claimed is:

1. A method for serializing a shared or cyclic data structure, the method comprising:
   encoding, by a processor, an object contained in a shared or cyclic data structure being serialized without looking up whether the object has been previously visited, in response to information available from a garbage collector indicating that the object has at most one reference;
   when the information from the garbage collector does not indicate that the object has at most one reference, looking up whether the object has been previously visited; and
   if the object has been previously visited, encoding the object using an encoding that comprises a reference to a previously encoded instance of the same object, and otherwise adding information about the object to a data structure indicating that the object has been visited and encoding the object.

2. The method of claim 1, wherein the information available from the garbage collector indicates which objects are multiobject roots.

3. The method of claim 2, wherein the information available from the garbage collector comprises one or more bitmaps that collectively indicate which objects are multiobject roots.

4. The method of claim 1, further comprising:
   using a write barrier to track which objects have had references added since the last garbage collection, and treating such objects as having more than one reference during the serializing.

5. The method of claim 1, further comprising performing garbage collection when serialization starts.

6. The method of claim 1, further comprising:
   in response to the information from the garbage collector not indicating that the object has at most one reference, including in a data stream into which the data structure is encoded an indication that the object possibly has more than one reference.

7. A computer comprising:
   a first means for determining, during serialization of a shared or cyclic data structure, using information available from a garbage collector, whether an object contained in the data structure has at most one reference;
   a second means for looking up whether the object has been previously visited;
   a third means for encoding the object; and
   a fourth means for encoding the object using an encoding that comprises a reference to an instance of the same object;
   wherein the first means is connected to the second means and third means for causing the third means to be used for at least one object without using the second means for that object, in response to the first means determining that the object has at most one reference; and wherein the fourth means is used for at least one object for which the first means does not determine that the object has at most one reference and for which the second means indicates that the object has not been previously visited.

8. The computer of claim 7, wherein the first means comprises a means for checking whether the object is a multiobject root.

9. A computer program product, stored on a non-transitory machine-readable medium, the computer program product configured to cause a computer to serialize a shared or cyclic data structure, causing the computer to:
   encode an object contained in a shared or cyclic data structure being serialized without looking up whether the object has been previously visited, in response to information available from a garbage collector indicating that the object has at most one reference;
   when the information from the garbage collector does not indicate that the object has at most one reference, look up whether the object has been previously visited; and
   if the object has been previously visited, encode the object using an encoding that comprises a reference to a previously encoded instance of the same object, and otherwise adding information about the object to a data structure indicating that the object has been visited and encoding the object.

10. The computer program product of claim 9, wherein the information available from the garbage collector indicates which objects are multiobject roots.

11. The method of claim 1, wherein the encoding is further performed without adding information about the object to an index data structure containing information about objects that have already been visited.

* * * * *